(12) United States Patent
Rappe et al.

(10) Patent No.: US 9,469,908 B2
(45) Date of Patent: Oct. 18, 2016

(54) SYNERGISTIC OXYGEN EVOLVING ACTIVITY OF NON-STOICHIOMETRIC SURFACES

(71) Applicant: The Trustees Of The University Of Pennsylvania, Philadelphia, PA (US)

(72) Inventors: Andrew Marshall Rappe, Penn Valley, PA (US); John Mark Martirez, Philadelphia, PA (US); Seungchul Kim, Seoul (KR)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 71 days.

(21) Appl. No.: 14/454,824

(22) Filed: Aug. 8, 2014

(65) Prior Publication Data

US 2015/0322579 A1   Nov. 12, 2015

Related U.S. Application Data

(60) Provisional application No. 61/991,862, filed on May 12, 2014.

(51) Int. Cl.
| | |
|---|---|
| C25B 1/04 | (2006.01) |
| C25B 11/04 | (2006.01) |
| H01M 14/00 | (2006.01) |
| C25B 1/00 | (2006.01) |

(52) U.S. Cl.
CPC .............. *C25B 1/04* (2013.01); *C25B 1/003* (2013.01); *C25B 11/0442* (2013.01); *C25B 11/0452* (2013.01); *H01M 14/005* (2013.01); *Y02E 60/366* (2013.01)

(58) Field of Classification Search
CPC ..... C25B 11/0442; C25B 1/003; C25B 1/04; H01M 14/005
USPC ......................... 205/340; 204/290.01–290.12
See application file for complete search history.

(56) References Cited

U.S. PATENT DOCUMENTS

| | | | |
|---|---|---|---|
| 2010/0133111 A1* | 6/2010 | Nocera ................... | C25B 1/003 205/633 |
| 2011/0220484 A1* | 9/2011 | Obenland ............... | C25B 1/003 204/157.5 |
| 2013/0168228 A1* | 7/2013 | Ozin ...................... | B01J 35/004 204/157.9 |
| 2014/0287342 A1* | 9/2014 | Jabbar .................... | C04B 35/47 204/290.12 |
| 2014/0374270 A1* | 12/2014 | Minegishi ............... | C01B 3/042 205/340 |

OTHER PUBLICATIONS

Kato et al, "Effect of amorphous TiO2 buffer layer on the phase formation of CaBi4Ti4O15 ferroelectric thin films," Appl. Phys. A vol. 81, pp. 861-864 (2005).*

Rong et al, "Hole-Conductor-Free Mesoscopic TiO2/CH3NH3PbI3 Heterojunction Solar Cells Based on Anatase Nanosheets and Carbon Counter Electrodes," J. Phys. Chem. Lett. 2014, vol. 5,pp. 2160-2164.*

* cited by examiner

*Primary Examiner* — Keith Hendricks
*Assistant Examiner* — Colleen M Raphael
(74) *Attorney, Agent, or Firm* — Baker & Hostetler LLP (57) ABSTRACT

Provided are systems that comprises an oxygen-metal catalyst, which systems can be used to perform water-splitting or other reactions. The systems can be operated in a photochemical manner.

17 Claims, 7 Drawing Sheets
(6 of 7 Drawing Sheet(s) Filed in Color)

SYNERGISTIC OXYGEN EVOLVING ACTIVITY OF NON-STOICHIOMETRIC SURFACES

CROSS-REFERENCE TO RELATED APPLICATION

This application claims the benefit of and priority to U.S. Provisional Application No. 61/991,862, filed May 12, 2014, "Synergistic Oxygen Evolving Activity of Non-Stoichiometric Surfaces," the entirety of which application is incorporated herein by reference for any and all purposes.

STATEMENT OF GOVERNMENT RIGHTS

This invention was made with government support under Air Force Office of Scientific Research grant FA9550-10-1-0248; United States Department of Energy grant DE-FG02-07ER15920; and Office of Naval Research grant N00014-12-1-1033. The government has certain rights in the invention.

TECHNICAL FIELD

The present disclosure is directed to the fields of electrocatalytic and photocatalytic materials.

BACKGROUND

The interest in electrochemical conversion of solar to chemical energy has encouraged an increase in research to find inexpensive, high-performing, and stable reduction-oxidation (redox) catalysts. In particular, significant attention has been given to transition-metal-based oxides to catalyze the highly complex four-electron oxidation of water to molecular oxygen.

The kinetics of oxygen evolution show the following trend in catalytic activity: $RuO_2$>$IrO_2$>Co≈Ni containing oxides >Fe≈Mn≈Pb containing oxides. Remarkably, this trend is almost completely the reverse of their abundance in the Earth's crust: Fe(56.3 g/kg)>Mn(0.95 g/kg)>Ni(0.08 g/kg)>Co(0.03 g/kg)>Pb(0.01 g/kg)>Ir, Ru($10^{-6}$ g/kg). It is thus highly desirable to find forms of the more abundant elements that would be comparable to, if not surpass, the Ir or Ru-containing compounds. Ti is one of the most abundant transition metals in the Earth's crust (5.65 g/kg), but Ti oxides suffer from very low electrocatalytic oxygen evolving activity.

The (110) surface termination of $TiO_2$ (rutile) is a poor oxygen evolving catalyst due to its weak oxygen binding energy. Other rutile-type structures such as $IrO_2$ and $RuO_2$ are found to be more effective catalysts, due in part to the much more flexible oxidation states of their metal ions. However, in addition to composition, catalyst structure is another fundamental determinant of catalytic reactivity.

$SrTiO_3$ is known to decompose water into $H_2$ and $O_2$ upon illumination with light. However due to its high band gap energy (3.2 eV), its application is limited to UV irradiation, the same as $TiO_2$-rutile.

Most studies concerning $SrTiO_3$ as water decomposition catalyst has been therefore concentrated on precious metal doping of $SrTiO_3$ for it to absorb in the visible light region. None have ventured on the study on the efficacy of the $SrTiO_3$ surface as a site of reaction. It has been shown that $TiO_2$-rutile is a poor surface catalyst for $O_2$ production, its oxygen evolving activity stems from the fact that under intense irradiation with UV light, the over potential associated with the evolution of $O_2$ is compensated. Accordingly, there is a need in the art for designing a water decomposition system not only concerning band gap engineering but also surface reactivity modifications.

SUMMARY

In one embodiment, the present disclosure provides 2×1 double layer ("DL") reconstruction of $SrTiO_3$ and enhanced oxygen evolution activity. This double layer reconstruction comprises a double layer of $TiO_2$ deposited on a $SrTiO_3$ structure. The enhanced oxygen evolution of the reconstruction of the $SrTiO_3$ can be comparable to the activity of $IrO_2$. In one embodiment, the 2×1 $TiO_2$ double layer is constructed via an annealing process. As such, $SrTiO_3$ with a $TiO_2$ double layer can be used as an electrocatalyst with suitable processing.

In another embodiment, reconstructed surfaces of titanium-based perovskites produce unusual $TiO_2$ structures on their surfaces. These structures give rise to different modes of oxygen binding, which modes in turn lead to different oxidative chemistry.

In another embodiment, the $TiO_2$-rich surfaces presented herein provide an enhancement of activity. For example, the enhancement can be seen by examining chemical reaction pathways on the $TiO_2$-rich surface reconstructions of $SrTiO_3$, and comparing them with the (110) surface of the rutile phase $TiO_2$.

In another embodiment, providing an anodic bias to $SrTiO_3$ with a reconstructed double layer of $TiO_2$ reconstructed on the surface can allow for enhanced oxygen evolution. The positive voltage (anodic bias) can be provided via a direct current source with a counter electrode (hydrogen evolving electrode) attached to the negative end of the source. As another embodiment, the $SrTiO_3$ acts as the anode at which oxygen is evolved. In still another embodiment, the energy can be provided through another means, such as, for example, via photoexcitation of a photoexcitable n-type semiconductor attached to and with a proper band alignment with a p-type doped $SrTiO_3$.

In another embodiment, the present disclosure provides crystal structures having a formula of $ABO_3$, where B is Ti can have a 2×1 double layer reconstruction of $TiO_2$ on the surface. For example, $BaTiO_3$, $CaTiO_3$, $ZrTiO_3$, $MnTiO_3$, $PbTiO_3$, $PbTiO_3$ with nickel doping, or any other (A,A')$TiO_3$ composition can feature such a structure. A double layer of $TiO_2$ can be associated with the surface of the bulk material. These materials can be catalysts, electrocatalysts, or photocatalysts.

In addition to perovskite structures (described elsewhere herein in further detail), ilmenite structures and Ruddlesden-Popper phase materials are also suitable.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

The present invention can be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. Further, reference to values stated in ranges include each and every value within that range. Any documents cited herein are incorporated herein by reference in their entireties for any and all purposes.

Exemplary Theory

Without being limited to any particular theory of operation, it is believed that $Ti^{IV}$-based oxides are poor catalysts for water splitting primarily because titanium(IV) binds O adsorbates weakly (due to its inability to be further oxidized), and binds the lattice O very strongly (showing its low tendency towards reduction). However, some reconstructed surfaces of $Ti^{IV}$-based perovskites present diverse Ti—O bonding environments, where some bonds are more covalent and electron-rich than others. Ti atoms with different bonding environments on a non-stoichiometric surface show novel catalytic behavior, as they can interact differently with adsorbates and function as a single catalytic unit by playing complementary roles in the reaction.

Figure 1:
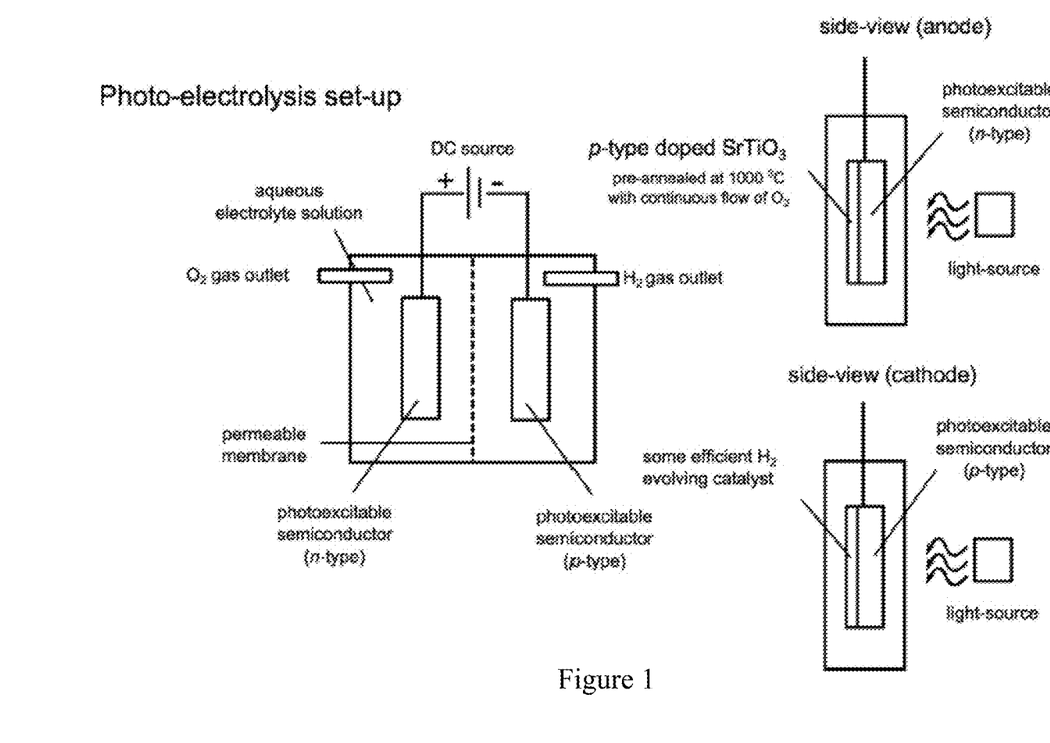
FIG. 1 illustrates an exemplary photoelectrolysis system.
Figure 2:
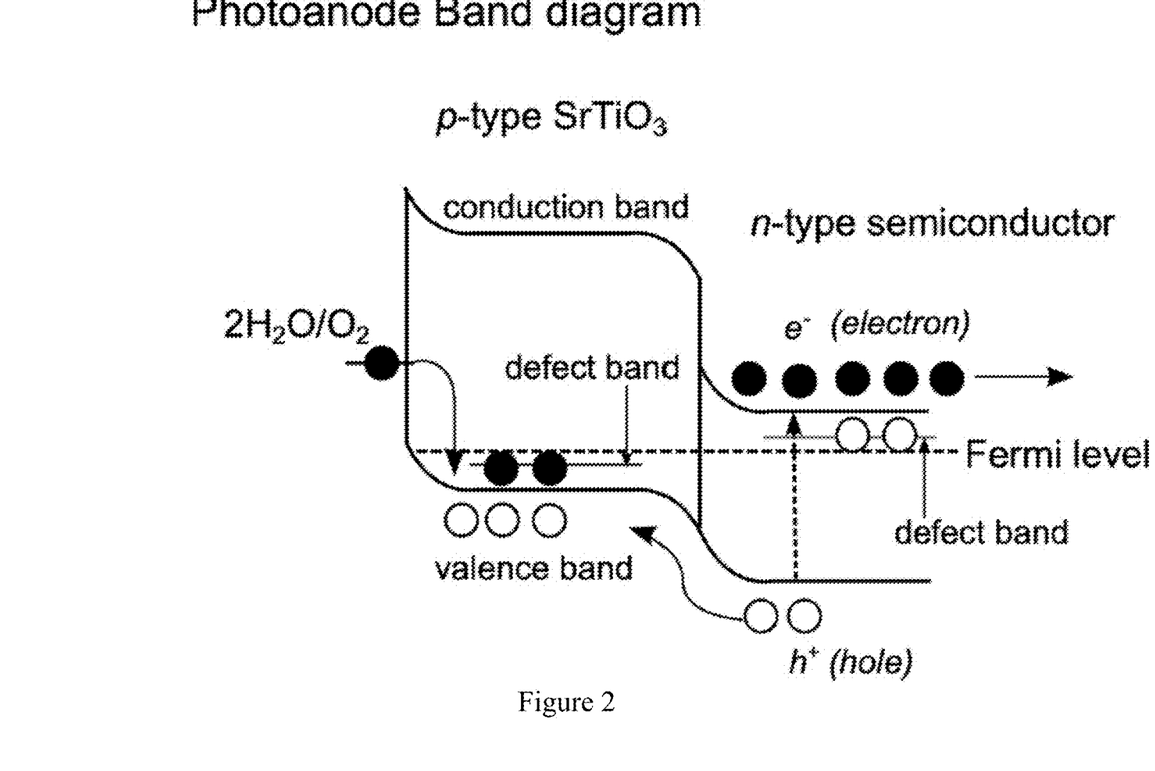
FIG. 2 illustrates an exemplary photoanode band diagram.
Figure 3:
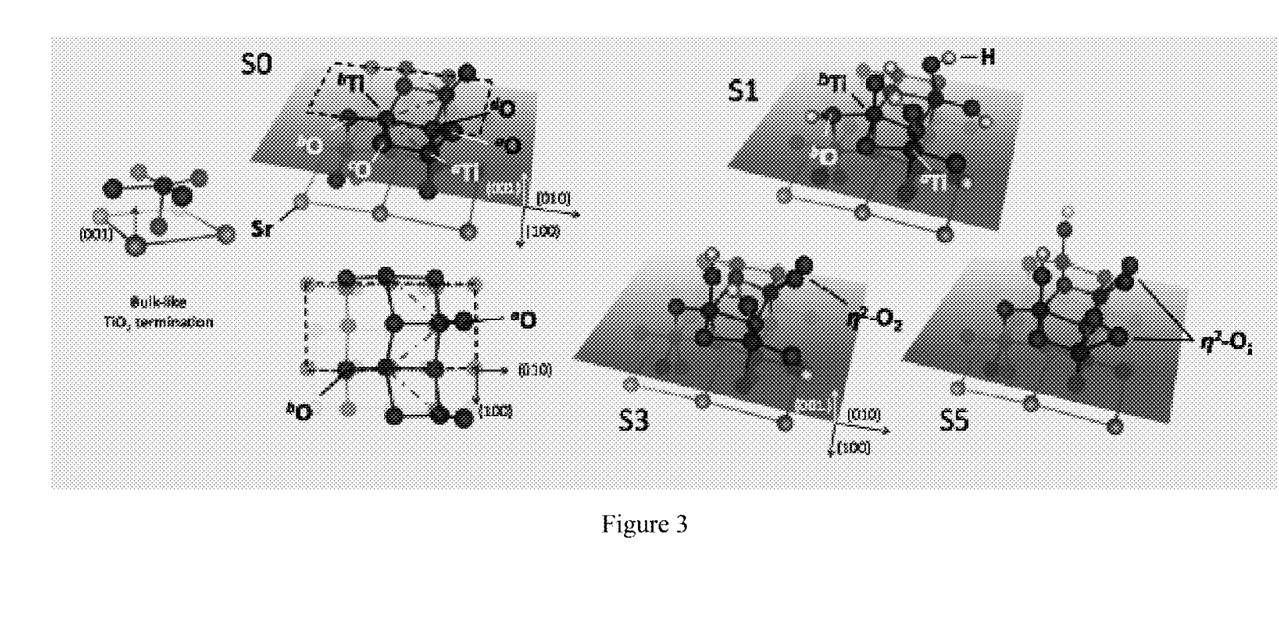
FIG. 3 represents ball-and-stick representations of different forms of the catalytically active nonstoichiometric $SrTiO_3$ reconstructed surface. The bulk-like $TiO_2$ termination and the $TiO_2$-rich 2×1 double layer (2×1-DL) surface reconstruction of (001) $SrTiO_3$ (S0) are shown. The surface unit cell of 2×1-DL is marked by a dashed line. S0 has the surface $TiO_5$ units arranged in a zig-zag pattern (traced by the dot-dashed line). The hydrated (S1) and some of the oxidized (S3 and S5) forms of the 2×1-DL with 2×2 supercell size. The S1 and S3 surfaces exhibit Ti—OH, while S3 and S5 have side-on Ti—$O_2$ ($\eta^2$-$O_2$). Structures S2 and S4 (not shown) show the same adsorption motif at the $^a$Ti sites as in S3 and S5, respectively.

To form a $TiO_2$-rich surface reconstruction, a (001)-surface-terminated $SrTiO_3$ can be heated to 950-1,000° C. and exposed to a continuous flow of high purity $O_2$. The surface has an over-layer of $TiO_2$ on top of a bulk-like (001) $TiO_2$ termination. The over-layer and some of the sub-layer O form edge-shared $TiO_5$ polyhedra distributed in a zig-zag pattern, as shown in FIG. 3 (S0).

There are four coordination motifs for the O atoms on the surface: one- ($^aO$), two- ($^bO$), three- ($^cO$), and four-fold ($^dO$). Both $^bO$ and $^dO$ are above a sublayer Ti, while both $^aO$ and $^cO$ are not. Further, $^aO$ is only bonded to one overlayer Ti ($^aTi$), thus giving the $^aTi$=$^aO$ a double bond character. The rest of the Ti—O bonds are single bonds.

To analyze catalytic efficiency, the energy change is calculated for each reaction step i, which gives the equilibrium reduction potential ($\epsilon^i_e$). The difference between the actual half-cell potential ($\epsilon$) and the equilibrium potential is the overpotential ($\mathcal{N}$). For multielectron electrochemical reactions that can be broken down into n single-electron steps, the following relation applies: $\mathcal{N} = (\epsilon - \epsilon_e^{overall}) = 1/n \sum_{i=1}^{n} (\epsilon - \epsilon^i_e)$.

The minimum $|\mathcal{N}|$ is defined at which all ($\epsilon - \epsilon^i_e$) are either ≤0 to favor reduction ($\epsilon$=min[$\epsilon^i_e$]) or ≥0 favor oxidation ($\epsilon$=max[$\epsilon^i_e$]), hereafter $\mathcal{N}^{min}_{red/ox}$. $\mathcal{N}^{min}_{ox}$=max[$\epsilon^i_e$]–1.23 V for the water splitting oxidation reaction. The mechanism, the barriers of the elementary reactions, and the value of $\epsilon^i_e$ are highly dependent on the nature of catalyst. Several ab initio studies of water splitting on oxide catalysts have pointed out that oxides with exceptional oxygen evolving activity have elementary steps with nearly equal thermodynamic barriers, and therefore low $\mathcal{N}^{min}{}_{ox}$. This metric accurately captures experimental activity trends of many oxides.

Prior to the activity evaluation, the relative stability of the 2×1-DL (S0) surface with respect to its hydrated and more oxidized forms can be determined Stability has been evaluated under realistic electrochemical conditions (298 K, equilibrium with an aqueous environment, and subjected to an anodic (oxidizing) potential).

Figure 4:
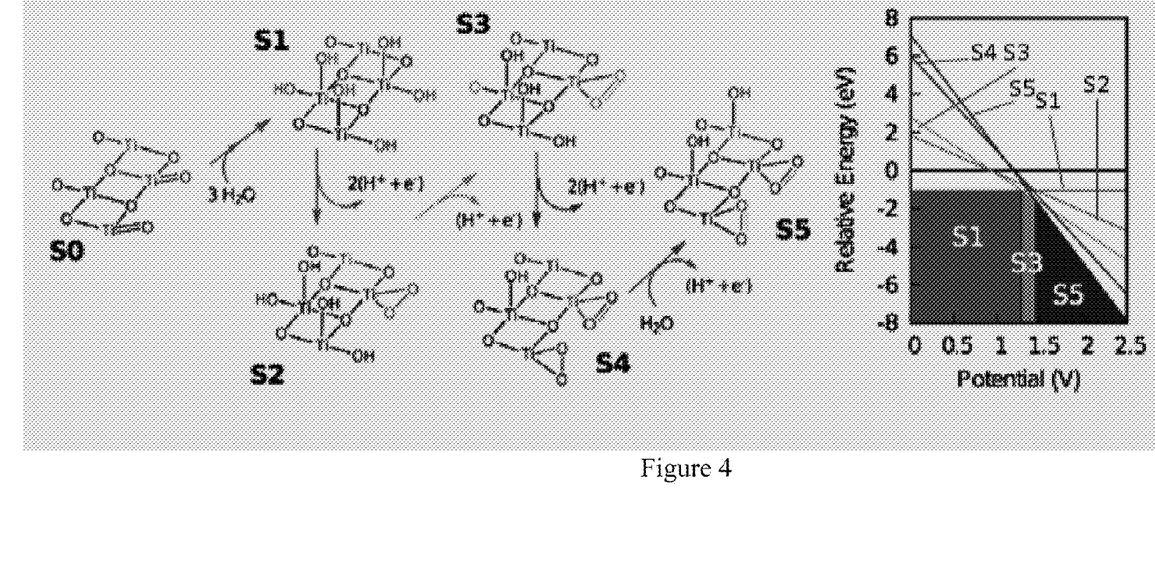
FIG. 4 presents stable surfaces and their relative energies as a function of applied potential. Left: The reaction scheme leading to the hydrated (S1) and oxidized forms (S2-S5) of the $TiO_2$-rich 2×1-DL (S0) surface. Subsurface layers are removed for clarity. Right: Surface phase diagram of the 2×1-DL as a function of applied potential against the standard hydrogen electrode at pH=0. Energy of each surface is plotted relative to that of 2×1-DL (S0)+4$H_2O$. S1, red line; S2, green; S3, orange; S4, blue; and S5, violet. S1, S3, and S5 are shown to be the stable surfaces; S5 is the most stable at higher potential, making it the most relevant surface for electrochemical water splitting.

To find the most stable surfaces, $H_2O$ molecules are been added to S0, and then H atoms are progressively removed. Without being bound to any particular theory, this is because it is expected that the surface becomes more O-rich as the potential bias becomes increasingly anodic. FIG. 4 shows schematics of the most stable structures found for each surface oxygen and hydrogen content. S1 is the maximally hydrated form beyond which addition of more $H_2O$ becomes unfavorable, while S2 to S5 show the resulting surfaces after progressive oxidation. FIG. 3 provides three-dimensional ball and stick representations of S1, S3, and S5.

The surfaces show various combinations of Ti—OH and side-on Ti—$O_2$ ($\eta^2$-$O_2$) structures. The $\eta^2$-$O_2$ could either be a peroxo (single-bonded O atoms) or a superoxo (bond order 1.5) depending on the extent of oxidation of the surfaces. These can be described by their charge, bond length and stretching frequencies, as shown in Table 1 below:

| | $\eta^2$-$O_2$ properties | | |
|---|---|---|---|
| Structure | orientation | Löwdin charge (e/molecule) | bond length (Å) | stretch ν (cm⁻¹) |
| S2 | horizontal | −0.75 | 1.40 | 971 |
| S3 | horizontal | −0.35 | 1.29 | 1174 |
| S4 | vertical | −0.72 | 1.41 | 961 |
| | horizontal | −0.36 | 1.30 | 1133 |
| S5 | vertical | −0.37 | 1.30 | 1156 |
| | horizontal | −0.33 | 1.29 | 1179 |
| P1 | horizontal | −0.32 | 1.29 | 1173 |
| P2 | horizontal | −0.34 | 1.29 | 1173 |

The high-charge and low-charge species show the lengths and vibrational frequencies of peroxo and superoxo ligands.

Exemplary plots of relative surface energy versus applied potential are shown in FIG. 4. The Gibbs free energies, $\Delta G_N$, (in eV) for conversion to surface N(SN) are of the form:

$$\Delta G_N = \Delta G°_{SHE} + \Delta G°_N - n_e{}^N e\epsilon - n^N{}_{H^+} \cdot pH$$

where $\Delta G°_{SHE} = 0.00$ eV is the Gibbs free energy change of the standard hydrogen electrode (SHE), which serves as the reference, $\Delta G_N$ is the standard Gibbs free energy change of the oxidation reaction:

$$S0 + n_{H2O}[H_2O(l)] \rightarrow SN + n^N{}_{H^+} + n_e{}^N e^-,$$

calculated using energies from density functional theory (DFT) simulation and experimental entropies, $\epsilon$ is the applied potential against SHE, and e is the electron charge. Without being bound to any particular theory, the plot in FIG. 4 suggests that only surfaces S1, S3, and S5 are thermodynamically stable in the range of interest of applied potential. At pH=0 and 0 V, S1 is the dominant form of the surface until 1.29 V, where S3 coexists. S3 is stable until 1.46 V, where S5 will become equally favorable. Beyond 1.46 V, S5 is the most stable form of the 2×1-DL. Because the oxygen evolution reactions on S1 and S3 require applied potentials that are higher than the maximum potentials at which they are stable, this study focuses on oxygen evolution on S5.

Figure 5:
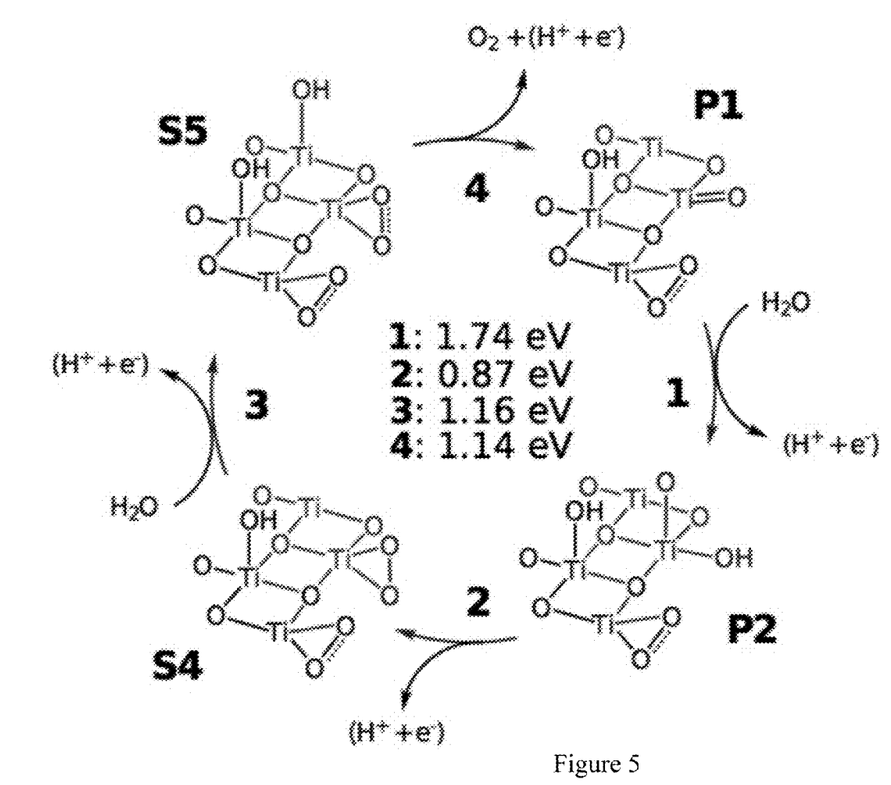
FIG. 5 presents a mechanism for the oxygen evolving catalytic cycle on the S5 reconstructed surface of $SrTiO_3$. For a complete cycle, two water molecules are consumed, and an $O_2$ molecule and 4H+ ions are produced. Production of the intermediates and products at each step involve proton abstraction and a loss of electron. The Gibbs free energy changes for each step are also given (in eV). Subsurface layers are removed for clarity.

FIG. 5 shows the four oxidation steps in the catalytic cycle involving surface S5. Beginning with surface P1, (1) $^a$Ti=O is oxidized by adding $H_2O$ and losing a proton. (2) Further oxidation of the $^a$Ti site generates a peroxo-type $O_2$ ligand. (3) After another single electron oxidation at the $^a$Ti site, coupled with the adsorption of a hydroxo at the $^b$Ti site, S5 is generated. (4) Finally, after loss of another electron, an oxygen molecule is released from the $^a$Ti site and subsequently replaced via OH deprotonation and $O^{2-}$ transfer from a $^b$Ti site, regenerating P1.

The first water oxidation (step 1) happens at a site where Ti is partially reduced. The Löwdin charge of the active $^a$Ti in structure P1 is +1.96e, which then changes to +2.10e in P2 (bulk Ti charge is ≈+2.16e). Because $^a$Ti is electron-rich on the P1 surface, the barrier found for the first water oxidation step to P2 is 1.74 eV, which is significantly lower than on typical $Ti^{IV}$ oxides; for example, it is 2.01 eV on the rutile-type (110) $TiO_2$ surface. Further oxidation (to S4) creates an $O_2$ moiety that has the properties of a peroxo ligand. The lower electron charge (−0.72e/molecule) of this $O_2$ species relative to the bulk oxide (≈−1.05e) indicates that the electron is taken away from the oxygen species rather than from Ti. After the third oxidation (to S5), the O—O bond (oriented vertically) contracts from 1.41 Å to 1.30 Å its stretching frequency rises from 961 cm⁻¹ to 1156 cm⁻¹, and the O charge decreases to −0.37e/molecule. This change is accompanied by the removal of a proton from the $^b$Ti site. The changes in the $\eta^2$-$O_2$ are consistent with a peroxide to superoxide transformation, another oxidation of the O species. This step also shows that the deprotonation and electron loss need not happen in the same site. Therefore, step 3 can be represented as the sum of two reactions:

$$^aTi(\eta^2\text{-}O_2) \rightarrow {}^aTi(\eta^2\text{-}O_2)^+ + e^-$$

$$^bTi + H_2O \rightarrow {}^bTi(OH)^- + H^+$$

After the fourth electron transfer step (to P1), the superoxo releases an electron to become $O_2$, and desorbs. The final deprotonation process at the $^b$Ti site then creates an $O^{2-}$ that moves to $^a$Ti and replaces the desorbed dioxygen molecule. This mechanistic step is suggested by DFT relaxation studies; when an O atom is on the $^b$Ti site and an $O_2$ is present on the $^a$Ti site, the $O_2$ spontaneously desorbs.

There are two distinct features in the mechanism presented here. First, the disclosed mechanism is of the Mars-van Krevelen type, but with $H_2O$ as the O source. A lattice oxygen ($^aO$) participates directly as a reactant, which is then replenished by a fully deprotonated water. Mars-van Krevelen-type mechanisms often operate in catalytic oxidation reactions, but the lattice O is usually replenished through dissociative adsorption of $O_2$. Second, there are two types of active metal sites on the surface, different in the way they share electrons with their adsorbates: $^a$Ti is more nucleophilic and electron-rich, while $^b$Ti is a stronger electrophile and electron-poor. Usually the mechanism involving transition metal oxides assumes that all active metal sites are homogeneous. In the disclosed mechanism, the two types of Ti on the surface have a synergistic effect on the $O_2$ production process. $^a$Ti serves as excellent binding site for electrophilic radicals such as .OH and .O., where they react with the $^a$Ti=$^a$O. The presence of a nucleophile, such as OH— and $O^{2-}$, on $^b$Ti then makes it easier to oxidize the adsorbate at $^a$Ti which eventually leads to the production of $O_2$. Thus, together they perform as one nearly ideal catalytic unit.

The Gibbs free energy change for step 1 is the largest ($\max[\epsilon^i{}_e] = 1.74$ eV), so the oxygen evolving mechanism has a $\mathcal{N}^{min}_{ox}$ of 0.51 V. Comparable DFT evaluations of the overpotential for water splitting on the (110) terminated rutile-type oxides ($RuO_2$, $IrO_2$, and $TiO_2$) and (100) terminated perovskite-type oxides have been reported. In these studies, the barriers to forming OH, O, OOH, and $O_2$ as assisted by those oxide surfaces have been calculated. These studies found an overpotential $\mathcal{N}^{min}_{ox}$ trend that is consistent with the experimental overpotential trends (e.g. for rutile-type oxides the overpotential trend is $TiO_2 > IrO_2 > RuO_2$). A 0.37 V thermodynamic overpotential was found for $RuO_2$, 0.56 V for $IrO_2$, and a higher overpotential for $TiO_2$, 0.78 V. For the bulk-like (001) $TiO_2$-terminated $SrTiO_3$, an overpotential above 1 V has been calculated. Fundamentally, the inability of $Ti^{4+}$ to change to higher oxidation states (unlike $Ru^{4+}$) means it can only weakly stabilize the formation of excess O (hydroxo, oxo, peroxo, and superoxo) moieties. Clearly, the undercoordinated Ti ions on the reconstructed surface of STO increases the range of O-bonding affinity, making it a great improvement over the (110) termination of the rutile-type $TiO_2$ and the (100) $TiO_2$-termination of $SrTiO_3$, with catalytic performance comparable to $IrO_2$. From the calculated minimum overpotential, a maximum of ≈70% energy storage efficiency $[-n_e e \epsilon_e/-n_e e(\epsilon_e + \mathcal{N}) \times 100\%]$ could be achieved using this surface as an oxygen evolving catalyst if running alongside surfaces offering barrierless $H_2$ electrochemical evolution at the cathode.

Alteration of the surface structure enhances the reactivity of the (001) $SrTiO_3$-DL surface not only quantitatively through modification of the electronic structure of the active site but also qualitatively through the opening of a lower-barrier mechanism for the reaction. Presented here is a clear picture of how perovskite-type oxide surface modification can bring about a much more efficient water oxidation catalyst. It has been also shown that mutually complementary metal sites can function as a good catalytic unit although they are poor catalytic sites on their own.

Exemplary Methods

Surface modifications of the $TiO_2$-rich (2×1) reconstructed surface that resulted from adding excess O and H to the surface in several geometries for each composition were explored. Density functional theory (DFT) calculations were performed with the Perdew-Burke-Ernzerhof (PBE) generalized gradient approximation (GGA) for the exchange-correlation functional as implemented in the Quantum ESPRESSO package. Norm-conserving optimized designed non-local pseudopotentials incorporating the effect of core electronic states of the atoms, were generated using the OPIUM package. Three-unit-cell thick slabs with 2×2 surface supercells and in-plane lattice constant of 3.95 Å, were used to simulate the surfaces. A vacuum separation of ≈16 Å in the direction normal to the slab has been included, with a dipole correction in the same direction to eliminate artificial electrostatic interactions. The Brillouin zone was sampled via the Monkhorst-Pack method with a 3×3×1 mesh. As for the molecules ($H_2$ and $H_2O$), the total energy of a gas phase molecule was approximated by calculating the energy of an isolated molecule that is separated from its repeat image by ≈12 Å along three orthogonal directions. In the $H_2O$ case, a dipole correction was also employed along the direction of the molecule's dipole. Spin-unrestricted calculations when warranted were performed. Structure relaxation has been carried out until the force on each atom is below 0.01 eV/Å. Zero point energy ($ZPE = \tfrac{1}{2}\Sigma_i \hbar \omega_i$) corrections to the total energy were calculated using linear response Γ-point phonon calculations for the surfaces and molecules. For surface calculations, the degrees of freedom were reduced by keeping the whole slab, except for the topmost $TiO_2$ layer and adsorbates, fixed. This was done because the zero point energy contribution of the bottom layers cancels each other out in the Gibbs free energy change calculations.

The Bockris electrochemical oxide path was used as an initial guess for the mechanism (J. Chem. Phys. 1956). Modifications in the reaction mechanism and intermediate states were introduced guided by the results in the DFT relaxation studies. The validity of the mechanism was confirmed through various structure searches to find energetically favored intermediates.

The standard Gibbs free energy changes of the oxidation reactions, $\Delta G^\circ_{ox}$, are calculated relative to the standard hydrogen electrode (SHE):

$$H^+(aq) + e^- \rightarrow \tfrac{1}{2} H_2(g), \Delta G^\circ_{red} = 0.00 \text{ eV}$$

Given such, the standard Gibbs free energy of $(H^+ + e^-)$,  is defined as:

$$G^\circ_{(H^+ + e^-)} = \tfrac{1}{2} G^\circ_{H_2}.$$

$G^\circ_{H_2}$ is calculated from DFT and tabulated standard entropy data.

The energy of $H_2O(l)$ was calculated from the $H_2O(g)$ DFT-energy using the relation:

$$G^\circ_{H_2O(l)}(298 \text{ K}, a=1) = G_{H_2O(g)}(298K, 0.035 \text{ bar}) = G^\circ_{H_2O(g)} + kT \ln(0.035 \text{ bar})$$

The $O_2$ energy, whose binding energy is severely overestimated by DFT, was calculated from experimental standard Gibbs free energy of the reaction: $2H_2O(l) \rightarrow O_2(g) + 2H_2(g)$ ($\Delta G^\circ = 4.92$ eV), and the calculated Gibbs free energies of $H_2O(l)$ and $H_2(g)$.

$$G^\circ_{O_2} = 4.92 \text{ eV} + 2[E^{DFT}_{H_2O} - E^{DFT}_{H_2} + \Delta ZPE(H_2O - H_2) - T(S^\circ_{H_2O(g)} - S^\circ_{H_2}) + kT \ln(0.035 \text{ bar})].$$

Binding energy overestimation was checked when dealing with peroxo and superoxo ligands by calculating the formation energies of hydrogen peroxide and hydroperoxy radical. It was found that the errors do not change the identity of the rate-limiting step nor the overpotential.

The effect of the applied voltage ($\epsilon$) on the of a reaction is simply given by $-n_e e \epsilon$, where $n_e$ is the number of electrons involved in the reaction and e is the electron charge. Additionally, the effect of the $[H^+(aq)]$ on $\Delta G_{ox}$ is given by $-n_{H+} kT \ln [H^+(aq)]$ or $-n_{H+} \cdot 0.0592 \cdot pH$ in eV at 25° C., where $n_{H+}$ is the number of hydrogen ions produced in the oxidation reaction. Thus, $\Delta G_{rxn} = \Delta G^\circ_{red} + \Delta G^\circ_{ox} - n_e e \epsilon - n_{H+} \cdot 0.0592 \cdot pH$. Given that the combined entropy of adsorbed species and the substrates are negligible relative to the entropy of the gas phase reactants and products ($O_2$, $H_2O$, and $H_2$), the entropy contribution to the $\Delta G_{rxn}$ is associated with the latter species. Possible effects of a water over layer on the surface were not considered here, presumed to be negligible considering that the degree of hydration of each adsorbate species is likely similar.

Exemplary Embodiments

In one exemplary embodiment, the present disclosure provides systems. These systems can suitably include (a) a catalytic material (suitably, e.g., a material according to the present disclosure) comprising oxygen and one or more metal atoms, the catalytic material further comprising a bulk portion and a surface portion, the surface portion forming a non-stoichiometric region under set conditions in contact with water, (b) an electrode in electronic communication with the catalytic material; and (c) a second electrode.

The catalytic material can include, for example, a perovskite structure. The catalytic material can also include titanium.

A surface portion of the catalytic material suitably comprises an overlayer and a sub-layer. The catalytic material can comprise, for example, $SrTiO_3$. The overlayer of the catalytic material can include edge-shared $TiO_5$ polyhedra, and the sub-layer can include corner-shared $TiO_6$ octahedra. Suitable such materials are described elsewhere herein in further detail In some embodiments, the surface portion of the catalytic material is capable of featuring two or more coordination motifs for oxygen. These coordination motifs—e.g., in $SrTiO_3$—suitably effect complementary chemistry among the metal atoms. Without being bound to any single theory, different motifs give rise to different chemical behavior for surface Ti atoms.

For a homogeneous system, the catalytically active metal can act in a uniform manner. In other systems—such as some of the exemplary systems described herein—complementary behavior is observed between Ti atoms due to an inhomogeneous bonding motif. As one example, water splitting ($H_2O$ to $H_2$ and $O_2$) is characterized as being a four-electron process. In such a process, there can be four redox steps. Other reactions (besides water splitting) can include different numbers of steps.

In some embodiments, the overlayer of the catalytic material can include titanium atoms arranged in an alternating pattern, in a zig-zag pattern, or both. The first type can be coordinated to one one-fold, two three-fold and two four-fold oxygen atoms while the second type is coordinated to one two-fold, three three-fold and one four-fold oxygen atoms. The sub-layer can likewise be composed of two different types of Ti atoms wherein one is coordinated to a two-fold overlayer oxygen atom while the other is bound to a four-fold overlayer oxygen atom. The sublayer can include titanium atoms in corner-shared six-fold coordination spheres.

The surface portion of the catalytic material can include at least two metal atoms having different electron affinities. The surface of the catalytic material is suitably selected such that it oxidizes water at a lower barrier than the bulk termination. The catalytic material accomplishes this by synergistic actions of the two types of titanium atoms. One acts a repository of excess oxygen, which is a raw material to produce an oxygen molecule, while the other only serves as deprotonation site.

The oxygen repository site can be capable of supporting oxo radical, peroxo and superoxo moieties that eventually transform to an oxygen molecule, which desorbs leaving the surface oxygen deficient. The other site serves as deprotonation site for water, which then produces an oxide that would restore the surface stoichiometry after the release of an oxygen molecule described above. The barriers associated with each elementary step suitably does not exceed the standard potential except for one where an excess (e.g., about 0.51 V) is needed to approach an equilibrium in standard conditions.

A system can, as disclosed herein, include a first electrode; $TiO_2$-rich surface reconstructed bulk $SrTiO_3$, that can be attached to a photoexcitable semiconductor; and a second electrode that serves as a counter electrode, that can also be attached to another photoexcitable semiconductor. The layers of $TiO_2$ can be—as described herein—be configured to act as an electrocatalyst.

The present disclosure also provides methods. These methods include contacting water and a catalytic material (such as those materials described herein) under such conditions so as to evolve molecular hydrogen, molecular oxygen, or both. The methods can further include applying an electrical potential to the catalytic material. This potential can be only about 0.51 V above the standard potential in the absence of illumination of a suitable wavelength. The electrical potential can be effected by illuminating the catalytic material. The electrical potential can also be effected by illuminating a photoactive material in electronic communication with the catalytic material such that the illumination gives rise to an electronic potential applied to the catalytic material.

In one embodiment, the method can include thermally annealing an amount (which can be in bulk form) of $SrTiO_3$ such that one or more layers of $TiO_2$ form on the surface of the bulk of $SrTiO_3$. The disclosed methods can also include providing a voltage across a bulk of $SrTiO_3$ with the one or more layers of $TiO_2$ on the surface of the bulk of $SrTiO_3$. A user can also hydrate the $TiO_2$. It should be understood that other materials aside from $SrTiO_3$ can be used in the disclosed systems and methods. As one example, a user can use $LiNbO_3$; at equilibrium, the surface can become $Li_2NbO_3$.

Without being bound to any particular theory, a system (e.g., FIG. 5) might be constructed such that the user applies a voltage between electrodes. The catalytic material is suitably disposed at the anode (i.e., so as to take electrons away from water, producing $O_2$ and protons). The electrons are returned at a higher energy where they combine with protons to make $H_2$. The steps of the methods can be performed separately such that $H_2$ and $O_2$ do not comingle. The system can be arranged so as to operate photochemically, wherein illumination excites electrons in the catalytic material, in a semiconductor attached to it, or in both. These electrons migrate and the resultant holes are filled with electrons from water. This is shown in FIG. 3, in which $^aO$ in FIG. 3 is not as tightly bound as other oxygen atoms in the structure; water can combine with $^aO$ to make oxygen and then refill the holes.

Catalytic materials can be processed by application of thermal energy. In one such process, the surface's top layer (containing a top layer of molecules having fewer neighbors than molecules elsewhere within the material) will melt. Barium titanate, strontium titanate, and other materials are suitable.

Enhanced or reconstructed double layer $TiO_2$ can be described with $2\times1$, $c(4\times2)$, and $c(6\times2)$ symmetries. These surfaces can be characterized as having one or more overlayers of stoichiometric $TiO_2$ on top of a bulk like $TiO_2$ termination.

In an embodiment, $SrTiO_3$ can be reconstructed such that a $TiO_2$ layers are created on the surface of the bulk of $SrTiO_3$. The $SrTiO_3$ with the $TiO_2$ layers can have an electrical potential placed across it, by means of electrodes or any other means known in the art. The $SrTiO_3$ can be hydrated, that is, it can be placed in, or associated with $H_2O$.

In an embodiment, reconstructed $TiO_2$ on $ABO_3$ materials where B=Ti that act as catalysts can be associated with $H_2O$. This $TiO_2$ reconstruction can result in electrocatalysts or photocatalysts. For a photocatalyst, electromagnetic radiation can be emitted from an emitter aiding the spontaneous decomposition of water.

As an example, the electromagnetic radiation can be of a wavelength greater than 400 nm, greater than 425 nm, greater than 450 nm, greater than 475 nm, greater than 500 nm, greater than 525 nm, greater than 550 nm, greater than 575 nm, greater than 600 nm, or even greater than 625 nm. As a further example, the electromagnetic radiation used as a catalyst can be in the visible portion of the spectrum. As a further example, the electromagnetic radiation can be in the visible and near infrared portion of the spectrum.

In an embodiment, double layer reconstructed $TiO_2$ on $SrTiO_3$ can be used in association with water. A voltage can be applied to the $SrTiO_3$. The oxygen and hydrogen making up the molecule can be used for any purpose. For example, the hydrogen could be used as a combustible material, as fuel for a vehicle, or in any other product, chemical composition, process or the like involving either hydrogen or oxygen. In another embodiment, decomposed hydrogen and oxygen could be stored.

2×1, 4×1, and 6×1 can be made of $SrTiO_3$, or even from other $ABO_3$ material where B=Ti using an annealing process. Such a process can provide for an inexpensive method of creating a good catalyst, electrocatalyst or photocatalyst. Further, these materials can be made by any other means known in the art including but not limited to vacuum deposition, sputtering, wet chemistry, photolithography, etching, annealing, stripping etc.

Experimental Framework

Although not limited to the description below, included are sample descriptions of enhanced $TiO_2$, the stability, the chemical processes and the like.

In an embodiment, Density functional theory ("DFT") in the PBE GGA framework norm-conserving pseudopotentials can be used. Slab geometry with three-unit-cell thick bulk substrate can be used to simulate the surface.

Surface stability evaluation and the oxygen activity testing are included herein. A model, assumes that the oxygen evolution process would proceed in a manner that each step involves a single electron transfer step with concomitant deprotonation. Second, the free energy of the steps of each processes relative to the standard hydrogen electrode (SHE) were evaluated:

$$H^+(aq) + e^- \rightarrow \tfrac{1}{2}H_2(g) \, \epsilon° = 0.0 V$$

Given this, the energy of a reaction will be shifted by $-e\epsilon$, where e is the number of electrons involved in the reaction and $\epsilon$ is the applied potential.

To avoid the calculation of the DFT energy of $O_2$, the bonding energy of which is overestimated by DFT, the reaction:

$$2H_2O(l) \rightarrow O_2(g) + 2H_2(g) \, \Delta G° = 4.92 \text{ eV}$$

is used as a reference. Any reaction involving $O_2$ would then avoid the use of the $O_2$ DFT energy via the virtue of the Hess' law.

Exemplary Results

Surface Stability

The relative stability of the hydrated and oxidized form of the 2×1 $TiO_2$-rich surface reconstruction of $SrTiO_3(001)$ in contact with water has been evaluated as a function of applied voltage. The reaction scheme is given in FIG. 3 which shows the thermodynamically relevant surfaces (left) and relative energy of these surfaces as a function of applied potential at pH=0 (right).

Based on the negative ΔG of hydration of the surface, reaction S0 to S1, the 2×1 DL would be highly saturated with water. Furthermore, the hydration process proceed with the water molecules completely dissociated, leaving hydroxlys on the surface.

The figure on the right in FIG. 3 shows the relative stability of surfaces S0 to S5, as a function of applied potential ($\epsilon$) at pH=0. S0-S1 is a potential independent process and therefore is invariant with the applied potential. At a potential of 1.29 V, the surface undergo phase change with one $^aTi$ forms O—O$^-$ moiety and a $^bTi$ site loses a proton. At about 1.46 V, the surface becomes fully oxidized with all $^bTi$ sites covered with OH while all $^aTi$ sites covered with O—O$^-$. It is then clear that surfaces S1, S3 and S5 are thermodynamically useful surfaces at and above the oxidation potential of $H_2O$ (1.23 V at 298 K and pH=0).

Oxygen Evolving Activity of 2×1 DL

To evaluate the oxygen evolving activity of the surfaces found, the mechanism of oxidation of $H_2O$ to $O_2$ had been defined assuming that the process follows a particular sequence of events each of which involves one-electron transfer. The sequence is shown in FIG. 4.

The most oxidized form of the surface is the most active form of the surface with the deprotonation of OH* to form O* as the rate limiting step. 0.28 V above the potential at which this surface is stable, this step becomes favorable thus making all the steps energetically down hill. Consequently the minimum potential required for maximum efficiency for this surface is 1.74 V.

The $TiO_2$ rich reconstruction of $SrTiO_3$ exhibit enhanced oxygen evolving activity, the most oxidized form of which exhibits the greatest activity. This exemplifies the role of structure in the chemical reactivity of catalysts.

EXAMPLES

Single crystals of 0.1% w/w Nb doped $SrTiO_3$ that are either 10×10×0 5 mm$^3$ or 10×5×0.5 mm$^3$ available from MTI Corp. were used. The crystals are one side-polished and have 0.08 ohm-cm manufacturer reported resistivity. No further analysis was done to confirm this.

Figure 6:
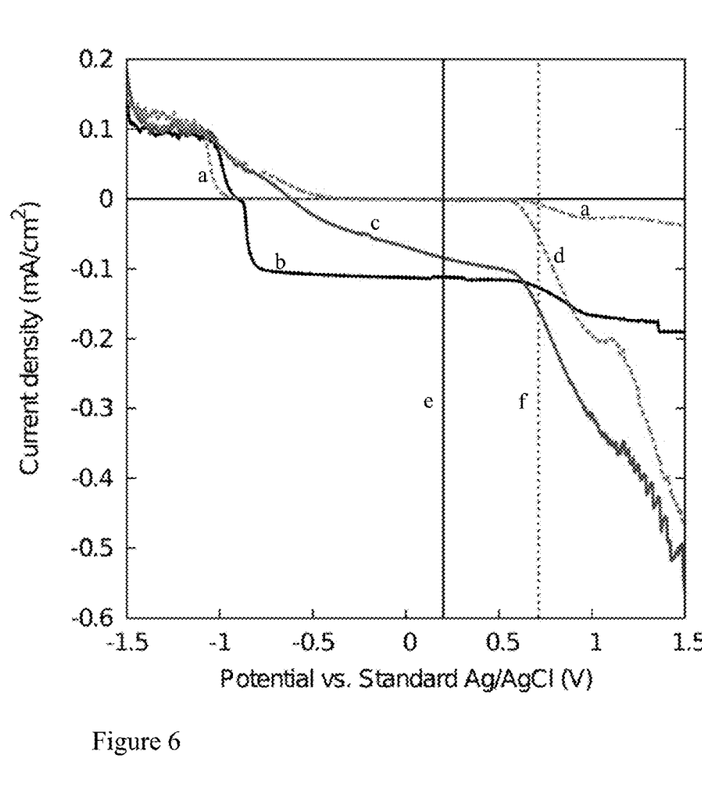
FIG. 6 presents LEED images for an Nb-doped $SrTiO_3$ (001) 1×1 unreconstructed (top) and 2×1 reconstructed (bottom) catalytic surfaces used in the present invention. Right: Current density vs. voltage profile for native chemically etched (gray (a), black (b)) and annealed (orange (d), red (c)) crystals with (solid lines) and without (broken lines) illumination of 200 W UV-Vis light source on the crystals. Solid blue line (e) marks the standard reduction potential of $O_2$ to $H_2O$ at pH 14 vs. Ag/AgCl in sat'd KCl reference electrode (0.20 V), while the broken blue line (f) marks the theoretical onset potential for 2×1 $TiO_2$-rich $SrTiO_3$(001) reconstruction (0.71 V). Scan rate: 2 mV/s, acquisition frequency: 2 Hz.

One crystal was Ar$^+$-sputtered (1 μA, 1 kV for 10 min) and UHV annealed at 600° C. This crystal showed unreconstructed 1×1 Low-energy Electron Diffraction (LEED) pattern (FIG. 6, left, top). On the other hand, the crystal chemically etched using 10M $NH_4F$—HF pH=4.5 then UHV annealed at 1090° C. for 7 min on a Ta base plate with a hole, resulted to a double-domain 2×1 LEED pattern, shown in (FIG. 6, left, bottom). A third crystal was prepared that was also chemically etched with 10M $NH_4F$—HF pH=4.5 to expose preferentially the $TiO_2$ (001) surface layer, as opposed to the SrO (001) surface layer. The latter crystal also showed 1×1 LEED pattern even after being annealed at a temperature as high as 1070° C.

Figure 7:
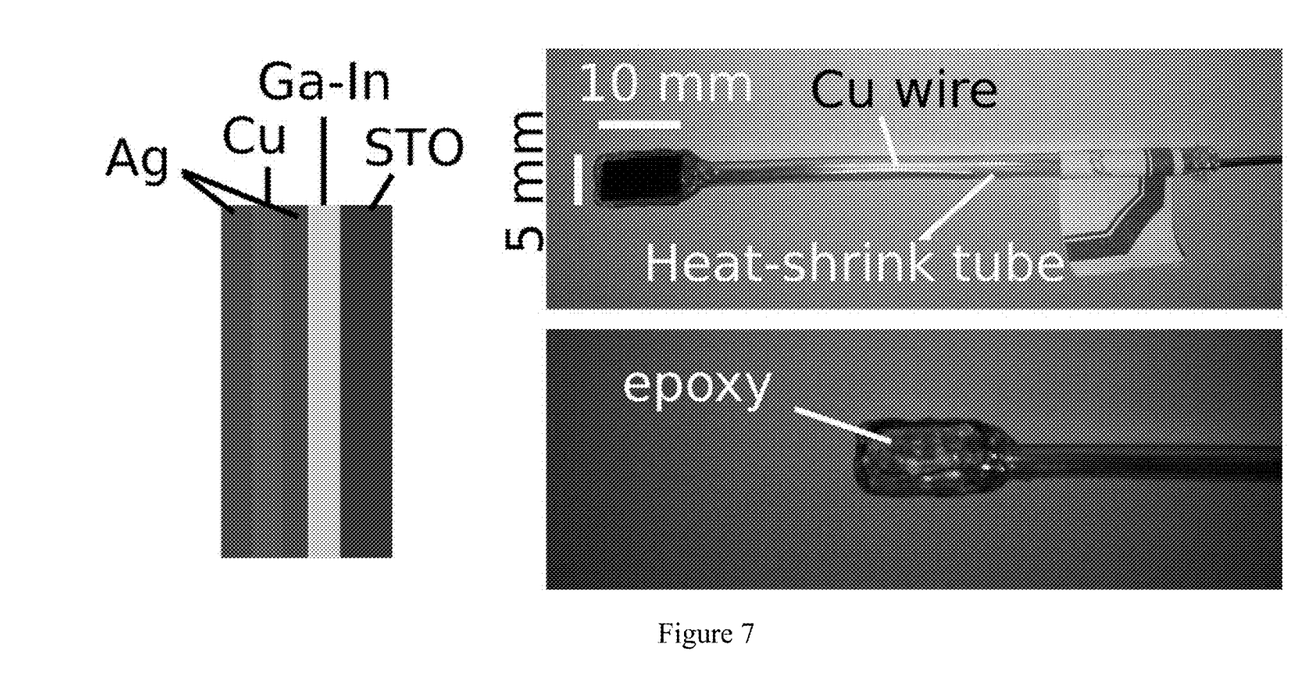
FIG. 7 presents an example of an $SrTiO_3$ electrode used in the present invention. Left: schematic of the $SrTiO_3$—Cu contact (not to scale). Right: electrode configuration (top: front, bottom: back).

The crystals were attached to copper wires using silver (Ag) paste. Gallium-Indium (Ga—In) (99.99%) eutectic was painted on the back of the crystals (unpolished side) to serve as the ohmic contact. Heat-shrink tubes were used to insulate the entire lengths of the copper (Cu) wires while epoxy was used to insulate the back of the crystals. See FIG. 7.

A three-electrode system was set up to assess the photoelectrochemical water-splitting performance of reconstructed and native Nb-doped $SrTiO_3$ crystals. With the Nb-doped $SrTiO_3$ electrode serving as the working electrode, a platinum (Pt) coil was used as a counter electrode, while a silver-silver chloride electrode in saturated AgCl and 4M KCl solution was used as the reference. Electrolysis was done in 1M NaOH solutions with constant stirring. Electrolysis were done with and without UV-Vis light illumination from a 200 W Hg(Xe) lamp, shining directly on the polished surface of the crystal.

What is claimed:
1. A system, comprising:
(a) a catalytic material comprising a bulk perovskite structure comprising a double layer of $TiO_2$ on the surface of said bulk perovskite structure, the $TiO_2$ forming a non-stoichiometric region under set conditions in contact with water, (b) an electrode in electronic communication with the catalytic material; and (c) a second electrode.

2. The system of claim 1, wherein the catalytic material comprises titanium.

3. The system of claim 1, wherein the surface portion of the catalytic material comprises a $TiO_2$ overlayer and a $TiO_2$ sub-layer.

4. The system of claim 1, wherein the catalytic material comprises $SrTiO_3$, wherein the overlayer comprises edge-shared $TiO_5$ polyhedra, and wherein the sub-layer comprises corner-shared $TiO_6$ octahedra.

5. The system of claim 4, wherein the sub-layer comprises titanium atoms in corner-shared six-fold coordination spheres.

6. The system of claim 4, wherein the catalytic material comprises Nb-doped $SrTiO_3$.

7. The system of claim 1, wherein the surface portion of the catalytic material is capable of featuring two or more coordination motifs for oxygen so as to effect complementary chemistry among the metal atoms.

8. The system of claim 1, wherein the overlayer comprises titanium atoms arranged in an alternating pattern, in a zig-zag pattern, or both.

9. The system of claim 1, wherein the double layer of $TiO_2$ comprises at least two metal atoms having different electron affinities.

10. The system of claim 1, wherein the surface of the catalytic material oxidizes water at a lower barrier than the bulk termination.

11. The system of claim 1, further comprising:

(d) water.

12. A method, comprising:

contacting water and the catalytic material according to claim 1 under such conditions so as to evolve molecular hydrogen, molecular oxygen, or both.

13. The method of claim 12, further comprising applying an electrical potential to the catalytic material.

14. The method of claim 13, wherein the electrical potential is effected by illuminating the catalytic material.

15. The method of claim 13, wherein the electrical potential is effected by illuminating a photoactive material in electronic communication with the catalytic material, the illumination giving rise to an electronic potential applied to the catalytic material.

16. The method of claim 12, wherein the catalytic material comprises Nb-doped $SrTiO_3$.

17. The method of claim 12, wherein the catalytic material comprises $SrTiO_3$, wherein the overlayer comprises edge-shared $TiO_5$ polyhedra, and wherein the sub-layer comprises corner-shared $TiO_6$ octahedra.

* * * * *